May 1, 1928. 1,668,361
H. B. FOLEY
SAW FILING MACHINE
Filed Aug. 13, 1925 2 Sheets-Sheet 1
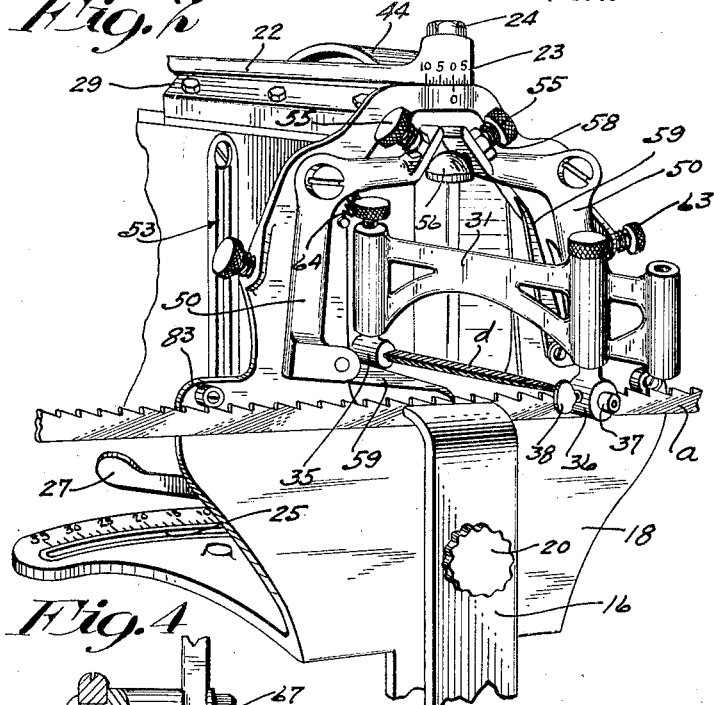
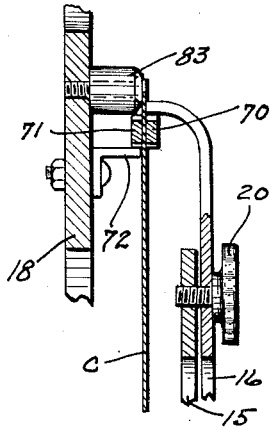
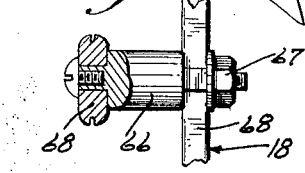
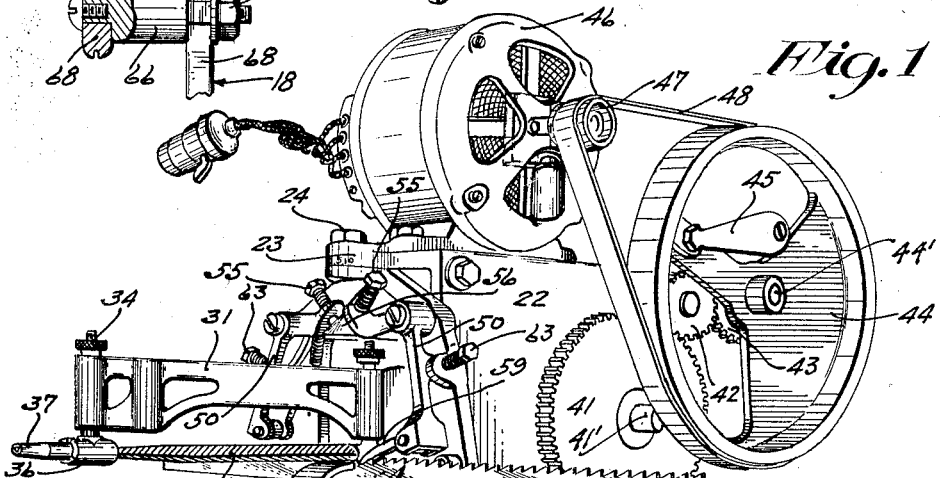
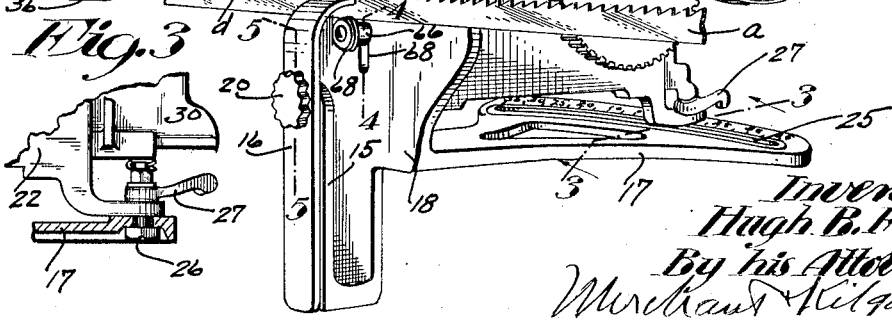
Inventor
Hugh B. Foley
By his Attorneys
Merchant Kilgore May 1, 1928. 1,668,361
H. B. FOLEY
SAW FILING MACHINE
Filed Aug. 13, 1925 2 Sheets-Sheet 2
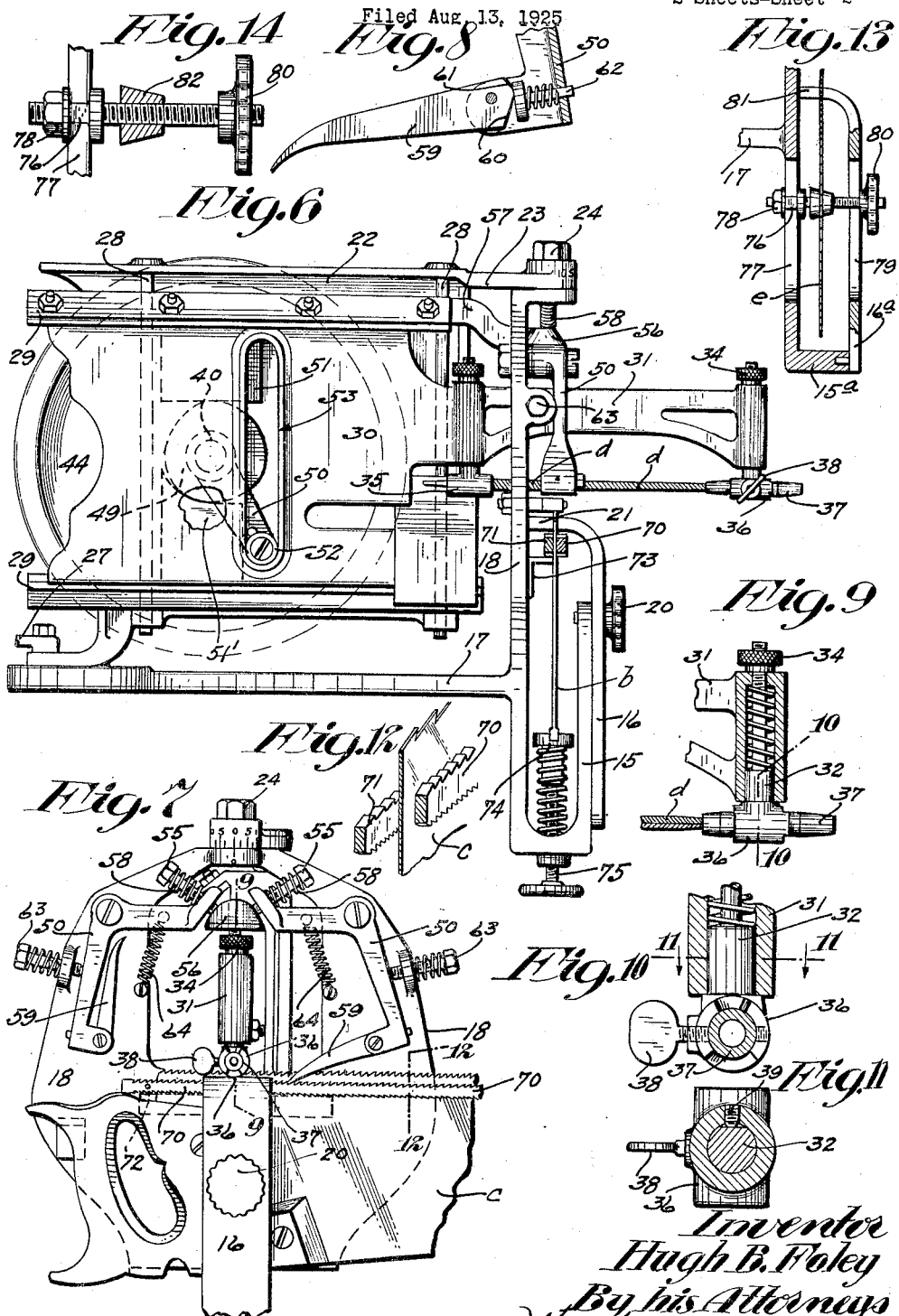
Inventor
Hugh B. Foley
By his Attorneys Patented May 1, 1928.

1,668,361

UNITED STATES PATENT OFFICE.

HUGH B. FOLEY, OF MINNEAPOLIS, MINNESOTA; MARY T. FOLEY, ADMINISTRATRIX OF SAID HUGH B. FOLEY, DECEASED, ASSIGNOR, BY MESNE ASSIGNMENTS, TO FOLEY SAW TOOL CO., INCORPORATED, A CORPORATION OF MINNESOTA.

SAW-FILING MACHINE.

Application filed August 13, 1925. Serial No. 50,066.

My invention relates to saw-filing machines and is in the nature of an improvement or refinement of the saw-filing machine disclosed and broadly claimed in my prior Patent No. 1,224,293, of May 1, 1917. Generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a perspective showing the improved saw-filing machine arranged to be motor-driven and showing a band or hack saw or a section thereof in position for filing, the front and right-hand side of the machine being exposed to direct view;

Fig. 2 is a front elevation of the machine in perspective but with the motor removed, the parts of the machine at the front and left side being exposed to direct view;

Fig. 3 is a fragmentary vertical section on the line 3—3 of Fig. 1;

Fig. 4 is a fragmentary view partly in elevation and partly in section on the line 4—4 of Fig. 1;

Fig. 5 is a fragmentary section taken approximately on the line 5—5 of Fig. 1, but showing a hand saw positioned for filing;

Fig. 6 is a right side elevation of the parts shown in Fig. 2, but showing in position for filing a saw blade that has a reinforced back;

Fig. 7 is a front elevation of the machine adjusted as shown in Fig. 2, but showing a hand saw or wood saw in position for filing, some parts being broken away;

Fig. 8 is a fragmentary view partly in front elevation and partly in section, showing one of the feed dogs;

Fig. 9 is a view partly in side elevation and partly in vertical section on the line 9—9 of Fig. 7;

Fig. 10 is a transverse vertical section taken on the line 10—10 of Fig. 9;

Fig. 11 is a horizontal section on the line 11—11 of Fig. 10;

Fig. 12 is a fragmentary perspective with some parts sectioned approximately on the line 12—12 of Fig. 7;

Fig. 13 is a vertical section showing in connection with the vise, means for holding a circle saw positioned for filing; and Fig. 14 is a view partly in elevation and partly in vertical section, showing the details of the saw-holding device illustrated in Fig. 13.

In Figs. 1 and 2, the saw blade, which may be assumed to be a portion of a band saw, hack saw, or meat saw, or the like, is indicated by the character $a$; in Fig. 6, the ribbed saw blade is indicated by the character $b$; and in Figs. 7 and 12, the hand saw blade is indicated by the character $c$. For the holding and sharpening of these several different kinds of blades, a vise or clamping device is provided, which, for the several purposes, has slightly different attachments or details, all as will presently appear. The vise, as shown, comprises a yoke-like or U-shaped member 15 and a loose member 16. The vise member 15 is formed integral with or otherwise rigidly secured to a flat horizontal base plate 17 and a vertical face plate 18, which latter is formed with a large opening 19. The loose vise member 16 is clamped to the member 15 by a clamping screw 20, and the saw blade is arranged to run loosely between the upper inturned end of said member 16 and a bearing flange 21 on the face plate 18.

Usually, an ordinary three-sided file $d$ will be used to sharpen the teeth of the saw, and this is arranged to be carried and given a compound endwise and up and down movement by a crosshead guide that is mounted for angular adjustments in respect to the saw, the face plate 18 and base 17. The crosshead guide, as shown, is in the form of an upright plate 22 provided at the upper portion of its front end with an arm 23 that is pivotally attached by a machine screw or stud 24 to a lug on the upper edge of the face plate 18. The face plate 17 may be rigidly secured by screws or otherwise to a bench or suitable support and at its rear edge it is formed with a segmental groove 25 that extends on the arc of a circle that is struck from the axis of the pivot screw 24.

The base plate 17, along the slot 25, is graduated to indicate the angle at which the crosshead guide and, hence, the file, will be set in respect to the saw or in respect to a position at right angles to the saw. For holding the crosshead guide plate 22 where set, there is shown a clamping bolt 26 that works through the slot 25 and through a perforation in the downturned lug 22ª of said crosshead guide, as best shown in Fig. 3, and which bolt is provided with a lever-equipped clamping nut 27.

Rigidly secured to the crosshead guide plate 22 at upper and lower ends, but laterally offset therefrom, is a pair of parallel vertical guide rods 28. Mounted on these rods 28 for slightly vertical movements is a secondary crosshead guide 29, in the upper and lower flanges of which a plate-like crosshead 30 is mounted for horizontal sliding movements. This crosshead plate 30 is provided with a forwardly projecting file-carrying arm 31 equipped with longitudinally spaced depending file holders. These file holders, as best shown in Figs. 6 and 9, include downwardly spring-pressed plungers 32 that are seated in sleeve-like portions 33 of the arm 31 and are provided at their upper ends with thumb nuts 34, by means of which they are made vertically adjustable. The plungers 32, at their lower ends, are formed with sleeve-like heads 35 and 36. The file c is adapted to be inserted directly into the head 35 and the other end of the file is adapted to be inserted into one or the other end of a double-ended sleeve-like socket 37 that is inserted axially through the head 36 and is arranged to be secured in different axial and rotative positions by a set screw 38. The shank of the outer plunger 32 is flattened and is loosely engaged by a short set screw 39, (see Fig. 11), that holds the same against rotation while permitting vertical adjustments of said plunger. When the thumb nut 34 is loosened, the plunger 32 will be pressed downward by its spring, thereby giving a yielding movement in the filing action.

The numeral 40 indicates a short shaft journaled in the angularly adjustable crosshead guide plate 22 and provided at its outer end with a spur gear 41, which, as shown, is connected by a spur pinion 42 to a pinion 43 secured on the hub of a fly wheel 44 also journaled to the crosshead bearing plate 22. The fly wheel 44 is shown as provided with a crank handle 45, by means of which it may be rotated by hand when the machine is to be hand-operated. When the machine is to be operated from a motor, as illustrated in Fig. 1, the motor 46 is adapted to be bolted or secured on top of the crosshead plate 22, and the pulley 47 carried by the motor shaft is adapted to drive the fly wheel 44 through a belt 48.

At the inner side of the crosshead guide plate 22, the shaft 40 is provided with a cam 49 and with a laterally offset crank arm 50. The secondary crosshead guide 29 is provided with a bearing lug 51, the flat under surface of which rests upon the cam 49. The numeral 52 indicates a roller-equipped screw that is adapted to be secured to the crank arm 50 in different positions from its axis, and works in a vertical cam slot 53 formed in the crosshead plate 30.

With the construction described, when the shaft 40 is rotated, the crank arm 50 will cause the crosshead plate 30, which carries the file, to reciprocate horizontally and the cam 49 will cause the secondary crosshead guide 29 and, hence, the said crosshead plate 30 to move vertically. The timing of the said movements is such that, at the limit of the outward movement of the file, the high portion of the cam 49 will come into action on the lug 51 and will lift the crosshead plate 30 and the file so that the file will be carried clear of the saw on its return movement, and when said plate 30 and the file have reached approximately the limit of their return movement, the low portion of said cam 49 will come into action on the lug 51 and will drop the plate 30 and the file slightly so that the file will properly come into action on the teeth of the saw.

The step by step feed movement of the saw is automatically produced by means best shown in Figs. 2, 6 and 7, and comprises as follows: Pivoted to the face plate 18 at opposite points is a pair of reversely acting bell crank shaped levers 54, which, at their opposing upper ends, are provided with reversely oblique screws 55 that afford adjustable contacts and that are engageable with the beveled head 56 formed on the front end of an arm 57 that projects from the front upper portion of the secondary crosshead guide 29. As shown, coiled springs 58 are applied to the screws 55 to take up slack and hold the same against accidental adjustments. Reversely acting driving dogs 59, (see particularly Figs. 7 and 8) are pivoted to the lower ends of the levers 50 and are adapted to be engaged either with the teeth of the saw or with toothed bars applied to the saw. At their outer ends, the dogs 59 are beveled to afford flat surfaces 60 and 61 and the lower arms of the levers 50 are provided with spring-pressed plungers 62 formed with heads against which the flat surfaces of the dogs are adapted to be seated. When one of the dogs is turned upward, its surface 61 will be engaged with the spring-pressed plunger 62 and will be yieldingly held in its operative position, but when the dog is turned downward, the head of the spring-pressed plunger 62 will operate on the surface 60 and yieldingly hold the dog in position for action on the saw teeth or on the teeth of the feed bar, as the case may be and as will presently more fully appear.

The numeral 63 indicates stop screws adjustably applied to lugs on the opposite edges of the face plate 18 and which limit the outward or return movements of the dog-carrying levers 50. Coiled springs 64, anchored to the face plate 18, and attached to the upper arms of the levers 50, tend to keep the said levers seated against the stops 63. The feed device described will feed a saw in either direction, but, of course, only one dog 59 will be operated at any one time. In the adjustment shown in Fig. 7, the saw will be fed from the right toward the left.

When the crosshead plate 30 and the file have reached approximately the limit of their outward movement, said plate and, hence, the secondary crosshead guide 29 will, by the cam 49, be raised and the upward movement then imparted to the arm 57 will cause its head 56, operating on the screws 55, to impart operative movements to the levers 50 and operative movement to the particular dog 59 that is turned down to operative position, thereby positively producing the saw movement. When, at approximately the limit of the return movement of the plate 30, the secondary crosshead guide 29 and arm 57 are lowered, the springs 64 will impart the return movements to the levers 50 and the operative dog 59. Of course, there will be no feed movement produced during the time that the file is being given its outward or saw-filing movement.

When the saw has been positioned, the driving dog may be properly set thereto by adjustment of the cooperating stop screw 63. With the stop screw 63 set in any particular position, the amount of movement that will be given to the operative dog will be determined by the adjustment of the cooperating screw 58 in respect to the head 56. In Fig. 7, the head 56 is shown as just moved into contact with the screws 55 and, hence, just ready to cause the dog-feeding movement as said head 56 is moved upward.

In Figs. 1 and 2, the feed dog is shown as arranged to operate directly on the saw teeth, and to support and guide the saw, I have in Figs. 1 and 4 shown a stud 66 that is adjustably secured by a nut 27 and a slot 68 formed in the face plate 18. At its outer end, this stud 66 is provided with a grooved roller 68, in which the lower edge of the saw $a$ is arranged to run. The toothed edge of the saw, as shown, is arranged to run under roller-equipped studs 69 applied to the face plate and these rollers keep the saw in a horizontal position. In Figs. 6, 7 and 12, I have shown toothed saw blade clamping bars 70 and 71, which, at their ends, by means of nut-equipped bolts 72 or the like, are adapted to be clamped against the opposing sides of the saw blade, parallel to the saw teeth. As illustrated, these bars 70 and 71 are provided with teeth on both edges and the teeth on the four edges of the two bars are of different fineness or number per inch, so that they can be utilized to correspond to saws having different numbers of teeth per inch. The driving dog will be arranged to operate on the upper toothed edge of the outer bar, and in Fig. 7, the right-hand dog 59 is shown as thus operating to feed the saw from the right toward the left. In Fig. 6, the numeral 73 indicates a shelf on which the innermost of the two toothed bars is adapted to ride or rest.

In Fig. 6, an upwardly spring-pressed guide head 74, subject to an adjusting screw 75, is applied to the lower portion of the vise member 15, and this guide head 74 is grooved so that it will receive the ribbed back of the saw blade $b$, such as shown in Fig. 6. In Figs. 13 and 14, I have shown a device for holding a circle saw $e$ in position for filing. This device comprises an arbor 76 provided with a square shank that works in a vertical slot 77 of the fixed vise member 15$^a$ and provided with a nut 78 by means of which it may be secured in different vertical adjustments. The outer end of the arbor 76 is threaded, works freely through a slot 79 in the removable vise member 16$^a$, and is provided with a nut 80, which, when tightened, holds the member 16$^a$ in position with its upturned end frictionally engaging the saw and frictionally pressing the saw against a stop lug 81 on the vise member 15$^a$. The saw $e$ is rotatively mounted on a conical hub 82 that is screw-threaded on the arbor 76.

In Figs. 2 and 5, I have shown horizontally spaced roller-equipped studs 83 that are adapted to engage either the teeth of the saw or of the inner clamping bar to hold the saw in horizontal position.

By removing the hand-crank-equipped fly wheel 44 from its journal 44' on the crosshead bearing plate 22, after the driving belt 48 has been removed therefrom, and mounting said fly wheel on the projecting end of the shaft 41' for the gear 41, the saw filing machine may be very quickly converted from a power-driven machine to a hand-operated machine.

To positively move the plate 30 and the file downward during their return movement so that said file will properly come into action on the teeth of the saw, the secondary crosshead guide 29 is provided with a bearing lug 51', located below the cam 49, and with the upper surface of which said cam comes into action when its low portion comes into action on the lug 51.

What I claim is:

1. In a saw-filing machine, saw-guiding means, a crosshead guide, a crosshead mounted on said guide and provided with means for holding a file, means for reciprocating said crosshead to produce the file movement, a pair of opposed levers for imparting reverse saw feed movements, reversely acting feed dogs applied one to each of said levers and adapted to be thrown into action at will, one at a time, means operative in time with the crosshead movements for simultaneously operating said opposed levers, means for limiting the return movements of said reversely acting levers, and means applied to said levers for varying the stroke thereof.

2. In a saw-filing machine, saw-guiding means, a crosshead guide, a crosshead mounted on said guide and provided with means for holding a file, means for reciprocating said crosshead to produce the file movement, a pair of opposed levers for imparting reverse saw feed movements, reversely acting feed dogs applied one to each of said levers and adapted to be thrown into action at will, one at a time, means operative in time with the crosshead movements for simultaneously operating said opposed levers, spring-pressed means operative to hold said feed dogs in respect to said levers yieldingly in operative or retracted positions.

In testimony whereof I affix my signature.

HUGH B. FOLEY.